(12) United States Patent
Gaier

(10) Patent No.: US 10,769,139 B2
(45) Date of Patent: Sep. 8, 2020

(54) SYSTEM AND METHOD FOR IMPLEMENTING QUERY TAGGING

(71) Applicant: JPMorgan Chase Bank, N.A., New York, NY (US)

(72) Inventor: Daniel J. Gaier, Powell, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 153 days.

(21) Appl. No.: 16/040,589

(22) Filed: Jul. 20, 2018

(65) Prior Publication Data

US 2019/0026330 A1 Jan. 24, 2019

Related U.S. Application Data

(60) Provisional application No. 62/536,145, filed on Jul. 24, 2017.

(51) Int. Cl.

| G06F 7/00 | (2006.01) |
|---|---|
| G06F 16/242 | (2019.01) |
| G06F 9/448 | (2018.01) |
| G06F 9/54 | (2006.01) |
| G06F 16/25 | (2019.01) |
| G06F 16/28 | (2019.01) |
| G06F 16/2457 | (2019.01) |
| G06F 8/30 | (2018.01) |

(52) U.S. Cl.
CPC .......... *G06F 16/2443* (2019.01); *G06F 8/315* (2013.01); *G06F 9/4488* (2018.02); *G06F 9/54* (2013.01); *G06F 16/24573* (2019.01); *G06F 16/252* (2019.01); *G06F 16/284* (2019.01)

(58) Field of Classification Search
CPC .......... G06F 16/2443; G06F 16/24573; G06F 16/284; G06F 16/252; G06F 9/4488; G06F 9/54
USPC ................................. 707/600–899
See application file for complete search history.

(56) References Cited

U.S. PATENT DOCUMENTS

2014/0279944 A1\* 9/2014 Ghandeharizadeh ....................... G06F 16/2365
707/690

\* cited by examiner

*Primary Examiner* — Isaac M Woo
(74) *Attorney, Agent, or Firm* — Hunton Andrews Kurth LLP

(57) ABSTRACT

The invention relates to applying a query tag in an object relational mapping tool. According to an embodiment of the present invention, a system comprises: a Repository API; a relational database management system (RDBMS); an object relational mapping (ORM) Tool that receives input from the Repository API and translates the input to the RDBMS; and a processor, coupled to the Repository API, the ORM Tool and the RDMBS, configured to perform the steps comprising: determine, at the Repository API, a query tag that identifies an origination source code; propagate the query tag to a database connection context within the ORM Tool; and inject the query tag into a generated SQL command.

20 Claims, 3 Drawing Sheets

SYSTEM AND METHOD FOR IMPLEMENTING QUERY TAGGING

CROSS REFERENCE TO RELATED APPLICATIONS

This application claims priority to U.S. Provisional Application 62/536,145, filed Jul. 24, 2017, the contents of which are incorporated herein in its entirety.

FIELD OF THE INVENTION

The invention relates generally to a system and method for implementing query tagging in an object relational mapping tool.

BACKGROUND OF THE INVENTION

Software developers often use an Object-Relational Mapping (ORM) tool when building applications. At a high-level, an ORM abstracts software developers from the database. Instead of interacting directly with the database's relational model using Structured Query Language (SQL), a developer can instead leverage an ORM to translate an object-oriented model to/from the relational model. The object-oriented model is written in the same code/language as the developer is building the application.

The ORM allows developers to work with a database without actually writing database access code and/or SQL code. The ORM automatically translates the developer's object-oriented code to SQL queries that the ORM then sends to the database for execution.

Because the ORM abstracts the database, the software developer may not know or even understand what is really going on "under the covers" in the database. Oftentimes, the SQL dynamically generated from the developer's code is not optimal. It may result in a poor performing SQL query.

In this example, a Database Administrator may identify a poor performing SQL query running in the database. Because the SQL is dynamically generated by the ORM, it is currently not possible to know what code is actually responsible for that query. As a result, Developers or Database Administrators cannot trace a SQL query back to the originating code. This is especially true in a production environment (where users are more likely to discover a poor performing SQL query) because it is much harder to debug and/or hook up diagnostic tools.

These and other drawbacks exist.

SUMMARY OF THE INVENTION

According to one embodiment, the invention relates to a system that implements a query tag in an object relational mapping tool. The system comprises: a repository; a Repository Application Programming Interface (API) that receives a request to access the repository; an Object Relational Mapping (ORM) Tool that receives the request from the Repository API and translates the request into a query that is executable by the repository; and a processor, coupled to the Repository API, the ORM Tool and the repository, configured to perform the steps comprising: receiving an application code that generates a SQL command; generating, at the Repository API, a query tag that identifies the application code that represents an origination source code; injecting the query tag into the SQL command; and executing the SQL command with the query tag on the repository.

According to another embodiment, the invention relates to a method that implements a query tag in an object relational mapping tool. The method comprises the steps of: receiving, at a Repository Application Programming Interface (API), an application code that generates a SQL command; generating, at the Repository API, a query tag that identifies the application code that represents an origination source code; injecting, at an Object Relational Mapping (ORM) Tool, the query tag into the SQL command; and executing the SQL command with the query tag on the repository; wherein the Object Relational Mapping (ORM) Tool comprises a processor coupled to the Repository API and the repository.

The system may include a specially programmed computer system comprising one or more computer processors, interactive interfaces, electronic storage devices, and networks.

The computer implemented system, method and medium described herein provide unique advantages to entities, organizations, database administrators and software developers. An embodiment of the present invention provides an innovative tool to quickly and easily identify source information in an ORM environment. With the innovations of the query tag, various users including Database Administrators and Software Developers can quickly and easily identify the application code that is responsible for generating the SQL query in question, and thus address problems with offending code and prevent further issues and complications. The developer may then investigate and update the corresponding object-oriented code so it results in the ORM generating better, more robust, SQL queries. The innovative tool provides a significant improvement to address problems with poor performing queries. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
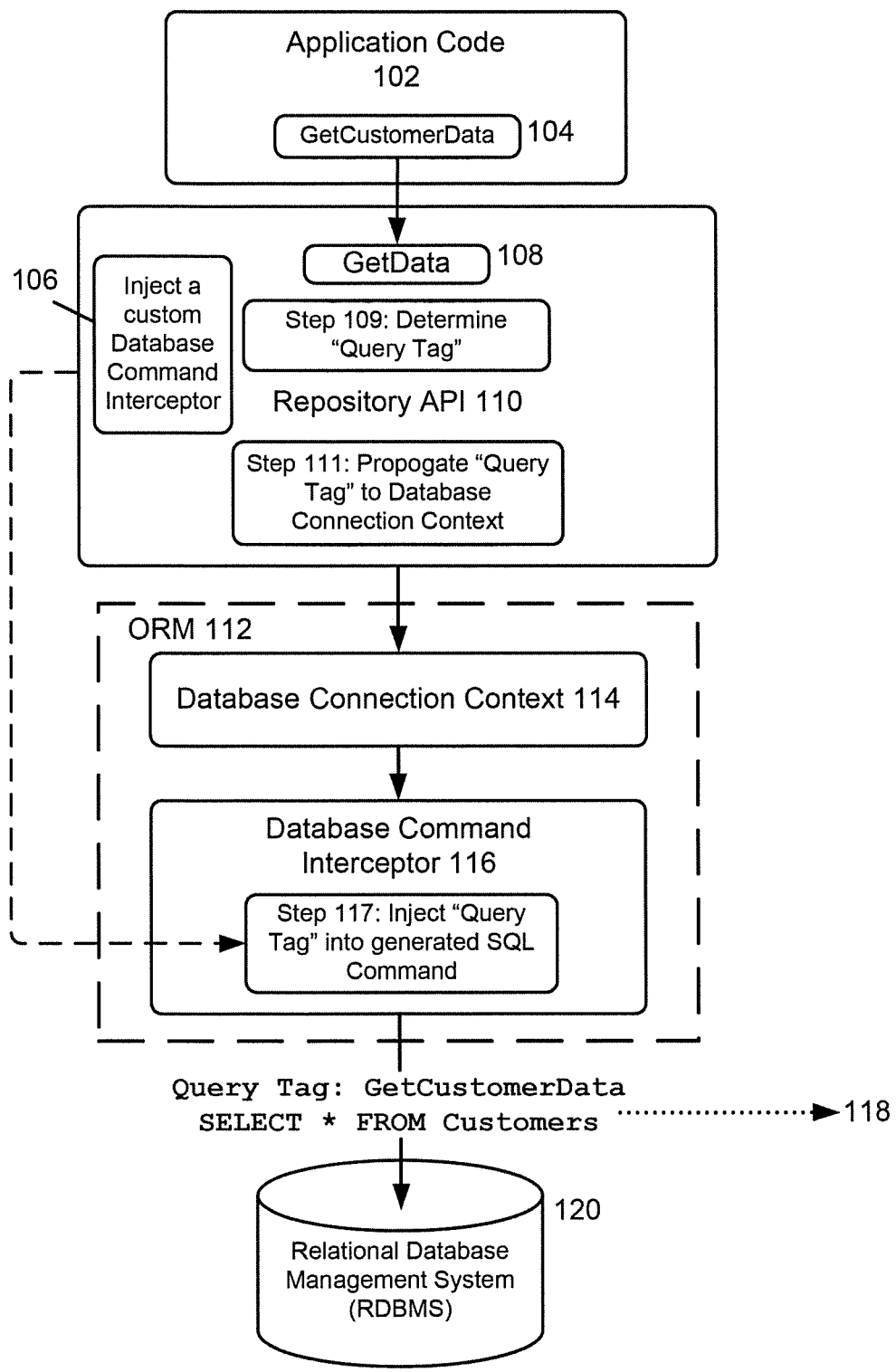
FIG. 1 is an exemplary diagram that illustrates object-relational mapping query tagging, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

When software developers use an ORM to access a database, they lose the ability to trace generated SQL queries back to the originating code. Because of this inability to correlate SQL queries with application code, it becomes very difficult to address poor performing SQL queries.

An embodiment of the present invention is directed to a framework to automatically add a "query tag" to the generated SQL that gets sent to the database. The query tag may identify source information, such as a calling code. For example, the query tag may be added to the SQL Query in the form of a SQL Comment, which Database Administrators may view as part of the SQL query. The query tag may be added, appended and/or otherwise associated or referenced in various ways. According to another example, the query tag may represent a code that may be associated with source data in a separate file or resource. Using the query tag, the Database Administrator and Software Developer may quickly and easily identify the application code that is responsible for generating the SQL query in question, and thus address the problem and prevent further issues and complications. The query tag may provide other source identification information as well as other useful data.

An embodiment of the present invention is directed to an Object-Relational Mapping (ORM) Tool that translates object-oriented code to SQL queries that may be sent to the database for execution. According to an exemplary embodiment, a Repository may inject a custom DBCommandInterceptor, which intercepts SQL Command Text, gets the query tag from the ORM, and further manipulates the generated SQL Command Text by inserting a SQL Comment. For example, the SQL comment may be inserted at a beginning of the text or elsewhere.

An embodiment of the present invention is directed to a framework that implements a Repository Pattern to centralize various data access operations. According to an embodiment of the present invention, a Repository Pattern allows for central data management and access control. For example, the Repository Pattern may represent a common design pattern. This pattern provides the ability to centrally manage and control data access in a reusable and testable way. An embodiment of the present invention leverages (or relies on) a Repository Pattern but is not limited to a Repository Pattern. An embodiment of the present invention may be implemented directly in the ORM's code. An application may access a database by calling an API on the Repository, which internally leverages an ORM to generate and issue a SQL query to the database. In a sense, the Repository "wraps" calls to the ORM. By wrapping the ORM with a Repository Pattern, a query tag code may be added in the Repository code. In this scenario, the code may represent custom code so that it may be added and changed, as opposed to third party code which is not meant to be modified by users.

According to an embodiment of the present invention, for Repository APIs related to issuing a database query, the API may automatically determine "who" called it. In other words, "who" may represent the name of the code method that called the Repository API. In accordance with the embodiments of the present invention, a query tag may represent a unique name (or identifier) used to identify the code that is resulting in the SQL query. For example, in .NET, getting the calling method name may be achieved automatically using a CallerMemberName attribute. The Repository APIs may also allow the developer to specify a name. For example, a developer may assign a query tag called "Get Pending Orders Query." Other variations may be realized.

An embodiment of the present invention may be incorporated into various Framework offerings. Having this as part of a common framework would assist teams to quickly and efficiently address code that was resulting in poorly generated and performing SQL. For example, an embodiment of the present invention may be implemented using various ORM frameworks, including cross-platform frameworks that run across multiple platforms.

For example, if a team uses .NET technology, the team may use a Repository framework that is written in .NET and also use Microsoft's Entity Framework (or other framework or tool) for database access. Entity Framework may represent an object-relational mapper that enables .NET developers to work with a database using .NET objects and thereby eliminate the need for most of the data-access code that a developers would need to write. The .NET framework may represent a software framework that developers can use to create applications. The .NET framework supports building and running apps and XML web services. The various embodiments of the present invention may be applied to various other frameworks and technologies. More particularly, the actual code and integration may be specific to the technology framework.

According to another example, the system may not implement a Repository Pattern and instead leverage extensibility points. This may be available in cross platform frameworks, such as Entity Framework Core, for example. In this example, extensibility points may be overridden to inject logic that identifies a calling code. For example, the system may generate a query tag by executing a GetCallingMethodName ( ) function. Accordingly, the system may automatically inject a query tag so that the responsible .NET code may be easily identified in the command text sent to the database.

According to an embodiment of the present invention, the Repository may leverage a number of ORM extensibility points and functions to pass along the query tag and intercept internal ORM logic. For example, the Repository may return a wrapper around the ORM's IQueryable implementation so it may intercept its "Execute Query" logic. Prior to query execution, the Repository may set-up the ORM's "context" with a designated query tag for this particular query. The Repository may also inject a custom DBCommandInterceptor, which may intercept the actual SQL Command Text before it is sent to the database for execution. This custom component may get the query tag from the ORM's "context" and further manipulate the generated SQL Command Text by inserting a SQL comment at the beginning of the text. This comment may include the query tag.

As a result, the ORM may issue a SQL Command that includes the additional comment having the query tag. An exemplary illustration may include:—Entity Framework Query Tag: GetPendingOrders SELECT*FROM Orders WHERE Pending=1.

For example, when a poor performing SQL query is discovered in the database, a Database Administrator may inform the development team about the offending query tag because the query tag comment is included with the SQL query. The query tag maps specifically to code the developer wrote so the system may quickly identify the offending code that is responsible for generating the poorly performing SQL. The developer may then investigate and update the corresponding object-oriented code so it results in the ORM generating a more robust and better performing SQL. This may be available through a user interface or other communication portal.

In the scenario where the Repository API is code that a user has built, an embodiment of the present invention may add and/or change ORM code. In this scenario, the system may add a query tag code. An embodiment of the present invention is directed to a code-based solution that may be triggered when a developer queries the database.

An embodiment of the present invention is directed to automatically determining a query tag. For example, the system may call a "Set Query Tag Text" function with a string the developer provides. The query tag may be automatically determined by using functionality built into the .NET framework that tells the user what code has "called" the function. Other languages and/or technologies may be implemented as well. Using this approach, the query tag may be a C# method name responsible for querying the database.

FIG. 1 is an exemplary diagram that illustrates object-relational mapping query tagging, according to an embodiment of the present invention. With web application development, many applications are backed by databases and there are multiple options for communicating with the databases. One option involves directly working with a database technology, e.g., Structured Query Language (SQL). Software developers can write that language directly and interact with the database. Another option is using an Object Relational Mapping (ORM) tool which is a framework that sits on top of a database. ORM allows a developer to build the model in an object oriented manner and automatically translates to the way the models are represented in the database.

Using an ORM, software developers are less aware of what is actually going on in the database. They may write some code that results in the ORM generating SQL that is sent to the database that may not necessarily be what they intended or is written in such a way that results in poor performance. With SQL statements that issue a query, current systems fail to provide a mechanism to track the SQL statements back to an originating code.

FIG. 1 illustrates Application Code 102 that executes a request via a Repository API 110. For example, Repository API 110 may send a request to ORM 112 that acts as an intermediary to Database 120.

In the exemplary illustration of FIG. 1, Application Code 102 calls an object-oriented method, "GetCustomerData" (represented by 104) to retrieve customer data. That method in turn calls a method on Repository API 110 to request the customer data from a database (e.g., the "GetData" method in this example). In this example, a Repository may represent a design platform to separate the data access logic from the actual data source. In this case, Repository API 110 controls access to the database. As shown in FIG. 1, the database is represented as Relational Database Management System 120.

In this example, the Repository has a set-up step, represented by 106, to inject a custom object that may be called prior to SQL Command executions. The custom object may be called a "Database Command Interceptor." This set-up set may be a one-time step or a step that is repeated with a call or set of calls.

Step 109 may determine "who" called the Repository. This set-up may leverage a .NET Framework's CallerMemberName attribute that may indicate the caller was the "GetCustomerData" method in the application code. Other attributes may be leveraged.

At step 111, the query tag may be propagated to Database Connection Context 114. When creating the ORM's database connection context for this query, step 111 may set-up a custom property to hold the Query Tag. This step scopes the Query Tag and is readily available for use in the next step.

At step 117, a custom "Database Command Interceptor" object gets called after the ORM generates the SQL Command (the query) but before it gets sent to the database for execution. As a result, Database Command Interceptor 116 has access to alter the SQL Command text before it is sent to the database. The customer interceptor object obtains the query tag from the ORM's Database connection context that was set-up in Step 111. Database Command Interceptor 116 may then manually manipulate the SQL Command text by inserting a SQL Comment, at the beginning of the text or elsewhere. This comment may include the Query Tag. The comment may include an identifier, link or other data that is associated with a source.

As illustrated at 118, the SQL Command text now includes a SQL Comment with the query tag. The query tag will be visible in tools, such as a SQL Profiler, which may be used to view the SQL Commands a database is executing. A database administrator and/or operations person may use such a tool to identify and investigate a "bad" or underperforming SQL query. "Bad" may mean the query runs slowly, or is causing other problems in the database, such as connection issues.

Figure 2:
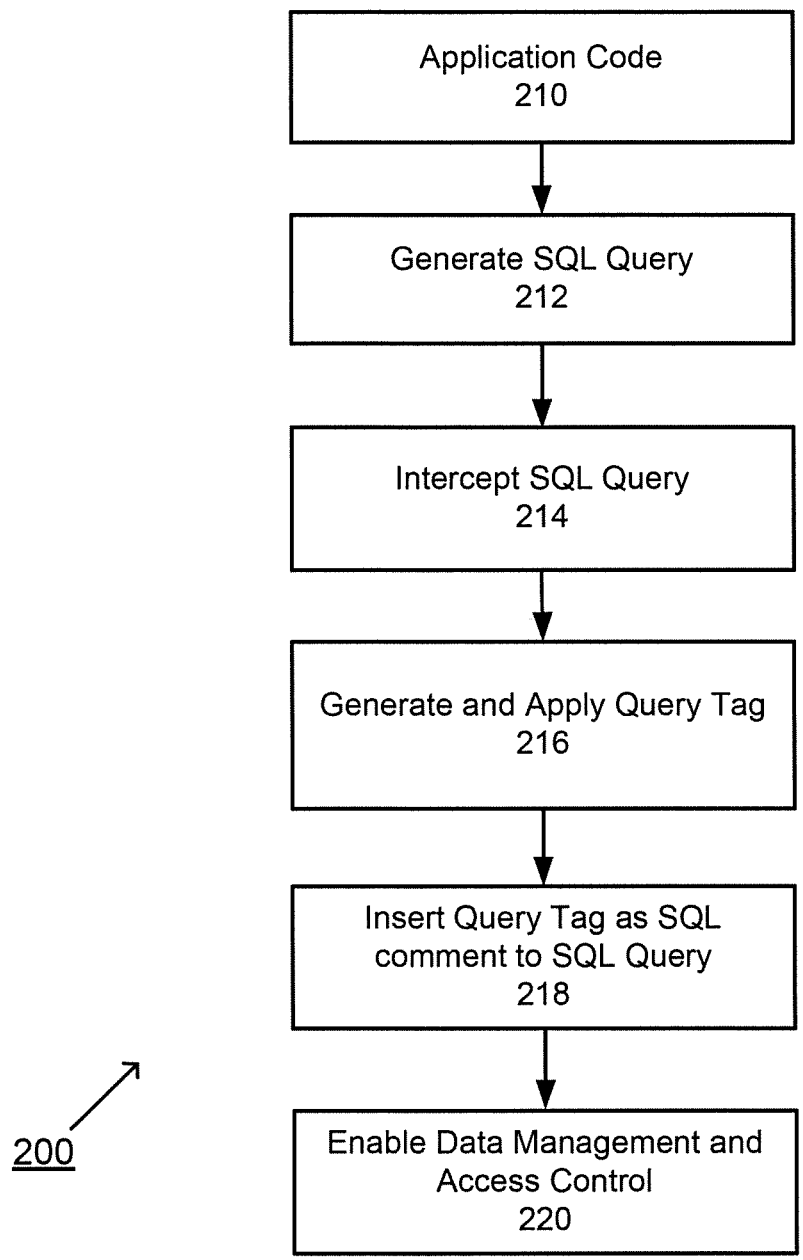
FIG. 2 is an exemplary flow diagram that executes object-relational mapping query tagging, according to an embodiment of the present invention.

FIG. 2 is an exemplary flow diagram that executes object-relational mapping query tagging, according to an embodiment of the present invention. At step 210, application may execute. At step 212, a SQL query may be generated. At step 214, the SQL query may be intercepted. At step 216, a query tag may be generated and applied. At step 218, the query tag may be inserted as a SQL comment to the SQL query. At step 220, data management and access control may be enabled. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, application may execute. The application may execute a request that seeks data and/or other information from a database.

At step 212, a SQL query may be generated. For example, the request may be transformed into a format compatible with the database. The format may include a SQL query and/or other database language.

At step 214, the SQL query may be intercepted. Prior to executing the SQL query at the database, the system may intercept the SQL query for query tagging.

At step 216, a query tag may be generated and applied. The query tag may be retrieved from a ORM. As the SQL query is generated, the system may tag the SQL query with code that is responsible for generating that query. This information provides guidance to the software development team and other users.

At step 218, the query tag may be inserted as a SQL comment to the SQL query. An embodiment of the present invention adds a query tag as part of the SQL query. The query tag may be added to a SQL comment. As part of the comment generated by the ORM, the entire SQL statement may be sent to a database and executed. With an embodiment of the present invention, a user may also view and access a query tag that is embedded as part of the SQL query. The query tag may represent a method name of the actual code the developer wrote. The query tag identifies the code responsible for generating that SQL query.

Query tag generally refers to an identifier of the actual code name that the developer wrote as part of their naming of the code. For example, a developer may write some piece of logic in code that performs a function or a method such as getting customer information from a database and call the method name "Get Customer Data." A corresponding query tag may include the method name, "Get Customer Data" which actually represents the raw name of the code.

At step 220, data management and access control may be enabled. The query tag may then be communicated to the software development team who can now quickly and easily identify the application code that is responsible for the generation of the "bad" SQL query. The software development team may then take action to update/fix the application code to address the problem. In addition, the responsive actions may be automatically applied. For example, a user may notice long-running SQL query or poor performing SQL query. The user may identify the actual SQL statement but cannot identify the actual code that the software developer wrote that is resulting in that query.

In addition, the query tag may include other data, such as metadata. For example, additional information may include parameters that resulted in the call. The parameters may be useful to identify a unique scenario where a certain action is occurring.

Figure 3:
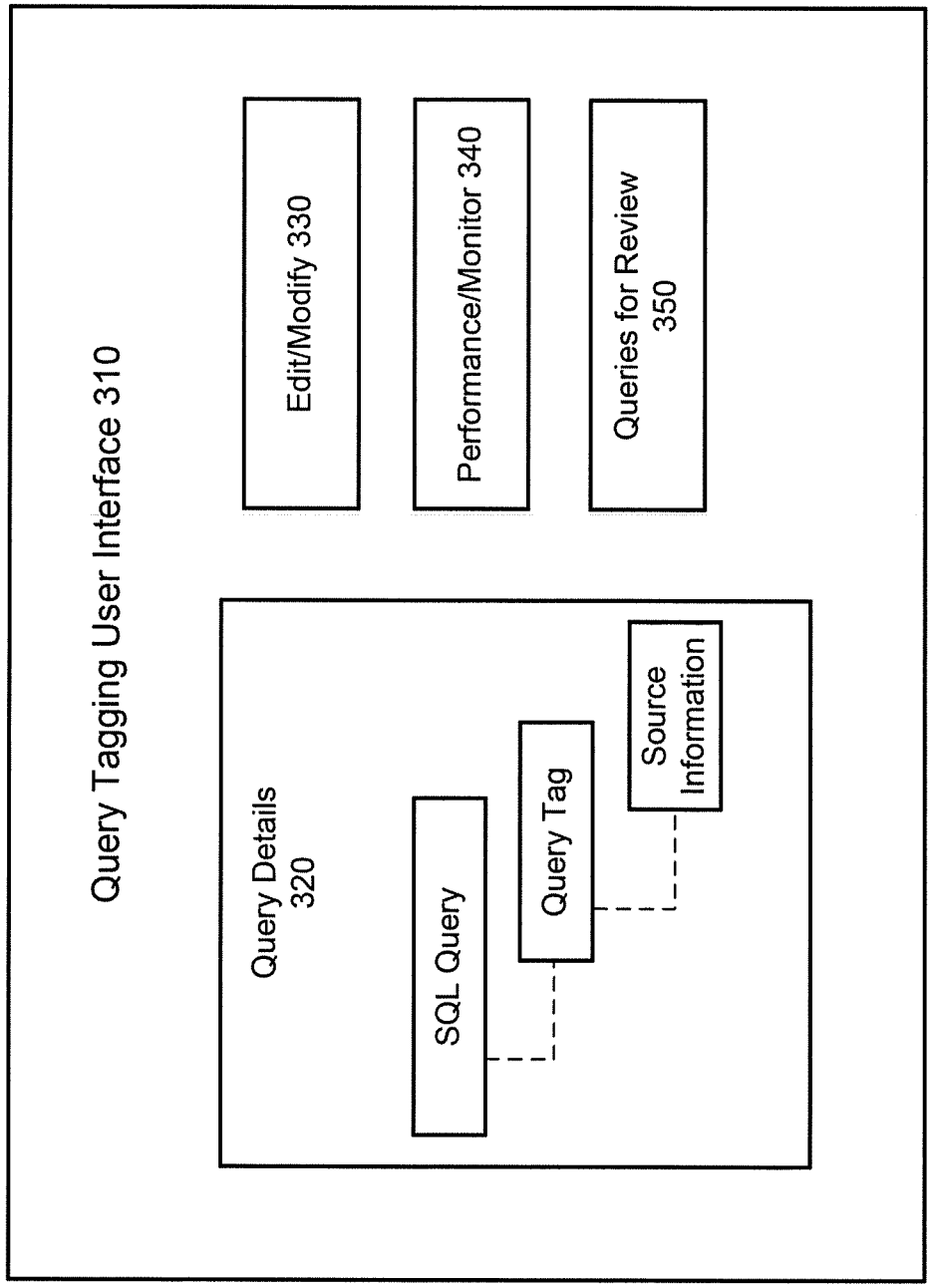
FIG. 3 is an exemplary illustration of a user interface, according to an embodiment of the present invention.

FIG. 3 is an exemplary illustration of a user interface, according to an embodiment of the present invention. An embodiment of the present invention may be directed to an interactive user interface or dashboard that illustrates how queries are performing. The interface or dashboard may provide analytics, performance data, etc. For example, a user may identify a poor performing query running in a production environment. The interface may perform as an informational tool that identifies the query at issue and provides additional source and/or other information.

For example, the system may enable a user to trace and/or profile a SQL statement that is being executed on a database. As shown in FIG. 3, Query Details 320 may represent an interactive graphic that identifies a query, a corresponding query tag and an associated source. Other details may be monitored and displayed. The user may identify and view details concerning a particular statement, set of statements as well as an entire collection of statements. The interface may also provide the ability to correct, modify, replace and/or remove the query. For example, Edit/Modify 330 may represent an interface that enables a user to modify or otherwise address a particular SQL query. The interface or dashboard may also provide statistical analysis that includes data regarding how long a query takes (execution time), number of queries executing, expected results and actual results as well as various types of performance data. This may be illustrated by Performance/Monitor 340. In addition, the system may identify one or more queries that perform below a predetermined threshold at Queries for Review at 350.

An embodiment of the present invention may analyze, process and display source data for SQL queries as well as other types of statements, such as select, inserts, updates, deletes, etc. Other database operations may be supported as well. In addition, an embodiment of the present invention may be extended to other types of database operations beyond SQL. Other languages (e.g., non-SQL) that manipulate and query data in relational and/or other databases may be applied.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example.

Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a query tag in an object relational mapping tool, the system comprising:
    a repository;
    a Repository Application Programming Interface (API) that receives a request to access the repository;
    an Object Relational Mapping (ORM) Tool that receives the request from the Repository API and translates the request into a query that is executable by the repository; and
    a processor, coupled to the Repository API, the ORM Tool and the repository, configured to perform the steps comprising:
    receiving an application code that generates a SQL command;
    generating, at the Repository API, a query tag that identifies the application code that represents an origination source code;
    injecting the query tag into the SQL command; and
    executing the SQL command with the query tag on the repository.

2. The system of claim 1, wherein the query tag is added as a SQL comment.

3. The system of claim 1, wherein the repository is part of a Relational Database Management System (RDBMS).

4. The system of claim 1, further comprising an interactive user interface coupled to the processor.

5. The system of claim 4, wherein the interactive user interface enables a user to modify the SQL command.

6. The system of claim 4, wherein the interactive user interface displays performance metrics for the SQL command.

7. The system of claim 4, wherein the interactive user interface displays the SQL command, corresponding query tag and associated source information.

8. The system of claim 7, wherein the SQL command comprises a SQL query.

9. The system of claim 1, wherein the ORM Tool implements a repository pattern to centralize data access operations.

10. The system of claim 1, wherein the ORM Tool implements extensibility points to inject logic that identifies the originating source code.

11. A method that implements a query tag in an object relational mapping tool, the method comprising the steps of:
    receiving, at a Repository Application Programming Interface (API), an application code that generates a SQL command;
    generating, at the Repository API, a query tag that identifies the application code that represents an origination source code;
    injecting, at an Object Relational Mapping (ORM) Tool, the query tag into the SQL command; and
    executing the SQL command with the query tag on the repository;
    wherein the ORM Tool comprises a processor coupled to the Repository API and the repository.

12. The method of claim 11, wherein the query tag is added as a SQL comment.

13. The method of claim 11, wherein the repository is part of a Relational Database Management System (RDBMS).

14. The method of claim 11, wherein the ORM Tool is further coupled to an interactive user interface.

15. The method of claim 14, wherein the interactive user interface enables a user to modify the SQL command.

16. The method of claim 14, wherein the interactive user interface displays performance metrics for the SQL command.

17. The method of claim 14, wherein the interactive user interface displays the SQL command, corresponding query tag and associated source information.

18. The method of claim 17, wherein the SQL command comprises a SQL query.

19. The method of claim 11, wherein the ORM Tool implements a repository pattern to centralize data access operations.

20. The method of claim 11, wherein the ORM Tool implements extensibility points to inject logic that identifies the originating source code.

* * * * *